(12) United States Patent
Tanaka et al.

(10) Patent No.: US 8,553,194 B2
(45) Date of Patent: Oct. 8, 2013

(54) LIQUID CRYSTAL DISPLAY DEVICE, LIQUID CRYSTAL DISPLAY DEVICE MANUFACTURING METHOD, AND ELECTRONIC DEVICE

(75) Inventors: Shinichiro Tanaka, Tottori (JP); Yasuhiro Nakanishi, Tottori (JP)

(73) Assignee: Japan Display West Inc., Aichi-Ken (JP)

( * ) Notice: Subject to any disclaimer, the term of this patent is extended or adjusted under 35 U.S.C. 154(b) by 176 days.

(21) Appl. No.: 12/831,413

(22) Filed: Jul. 7, 2010

(65) Prior Publication Data

US 2011/0013131 A1    Jan. 20, 2011

(30) Foreign Application Priority Data

Jul. 14, 2009    (JP) ................................ P2009-165339

(51) Int. Cl.
*G02F 1/1339*    (2006.01)
(52) U.S. Cl.
USPC ............................ 349/157; 349/114; 349/138
(58) Field of Classification Search
USPC .......................................... 349/155, 156, 157
See application file for complete search history.

(56) References Cited

U.S. PATENT DOCUMENTS 6,414,739 B2 *    7/2002    Suzuki ........................ 349/155

FOREIGN PATENT DOCUMENTS

| JP | 2003-121857 | 4/2003 |
|---|---|---|
| JP | 2005-189662 | 7/2005 |
| JP | 2007-011272 | 1/2007 |
| JP | 2007-171715 | 7/2007 |
| JP | 2007-199708 | 8/2007 |
| JP | 2007-286384 | 11/2007 |
| JP | 2008-242035 | 10/2008 |
| JP | 2009-139672 | 6/2009 |
| JP | 2010-197488 | 9/2010 |

OTHER PUBLICATIONS

Notification of reasons for refusal issued in connection with Japanese Patent Application No. 2009-165339, dated Feb. 26, 2013. (6 pages).

* cited by examiner

*Primary Examiner* — Richard Kim
(74) *Attorney, Agent, or Firm* — K&L Gates LLP

(57) ABSTRACT

A liquid crystal display device including: first and second substrates disposed oppositely to each other; a first spacer formed on a side of the first substrate so as to be directly or indirectly abutted against a side of the second substrate; and a second spacer formed on the first substrate side so as to be spaced apart from the second substrate side; wherein a concavo-convex portion is formed in an area, of the second substrate, corresponding to the second spacer on the first substrate side.

8 Claims, 9 Drawing Sheets

ND ELECTRONIC DEVICE

CROSS REFERENCES TO RELATED APPLICATIONS

The present application claims priority to Japanese Priority Patent Application JP 2009-165339 filed in the Japan Patent Office on Jul. 14, 2009, the entire content of which is hereby incorporated by reference.

BACKGROUND

The present application relates generally to a liquid crystal display device, a liquid crystal display device manufacturing method and an electronic device. In particular, the application relates to a liquid crystal display device in which a first spacer formed in abutment against a second substrate side and a second spacer formed to be spaced apart from the second substrate side are provided on a first substrate side, a method of manufacturing the same and an electronic device.

There have heretofore been known liquid crystal display devices in which a first spacer formed in abutment against a second substrate side and a second spacer formed to be spaced apart from the second substrate side are provided on a first substrate side, a method of manufacturing the same and an electronic device. See e.g. Japanese Patent Laid-open No. 2003-121857, 2007-171715 and 2008-242035.

Japanese Patent Laid-open No. 2003-121857 discloses a liquid crystal display device that includes a first columnar spacer (a first spacer) and a second columnar spacer (a second spacer) formed on a transparent substrate side of a transparent substrate (a first substrate) and an opposite substrate (a second substrate) disposed oppositely to each other. In the liquid crystal display device described in Japanese Patent Laid-open No. 2003-121857, the front surface of the first columnar spacer on the opposite substrate side is disposed in abutment against the front surface of the opposite substrate. The front surface of the second columnar spacer on the opposite substrate side is disposed to be spaced apart from the front surface of the opposite substrate. If a load is applied to the transparent substrate and the opposite substrate, the transparent substrate and the opposite substrate are bent toward a liquid crystal layer provided between the transparent substrate and the opposite substrate. In this way, the second columnar spacer comes into abutment against (into full contact with) the front surface of the opposite substrate, which restricts a cell gap between the transparent substrate and the opposite substrate.

Japanese Patent Laid-open No. 2007-171715 discloses a liquid crystal display device that includes a first spacer and a second spacer formed on an upper substrate side of an upper substrate (a first substrate) and a lower substrate (a second substrate) disposed oppositely to each other; a planarizing film made of a photosensitive resin formed on the lower substrate side; and a concave portion formed in an area, corresponding to the second spacer, of the planarizing film on the lower substrate side. In the liquid crystal display device described in Japanese Patent Laid-open No. 2007-171715, the front surface of the first spacer on the lower substrate side is disposed in abutment against the front surface of the planarizing film on the upper substrate side. The front surface of the second spacer on the lower substrate side is disposed to be spaced apart from the front surface of the concave portion. The front surface of the concave portion is formed planarized. When a load is applied to the upper substrate and the lower substrate, the second spacer comes into abutment against (into full contact with) the planarized front surface of the concave portion, which restricts the cell gap between the upper substrate and the lower substrate.

Japanese Patent Laid-open No. 2008-242035 discloses a liquid crystal display device that includes a first columnar structure (a first spacer) and a second columnar structure (a second spacer) formed on a first substrate side of a first substrate and a second substrate disposed oppositely to each other; an insulating layer made of a photosensitive resin formed on the second substrate side; and a concave portion formed in an area, of the insulating layer, corresponding to the second columnar structure. In the liquid crystal display device described in Japanese Patent Laid-open No. 2008-242035, the front surface of the first columnar structure on the second substrate side is disposed in abutment against the front surface of the insulating layer on the first substrate side. The front surface of the second columnar structure on the second substrate side is disposed to be spaced apart from the front surface of the concave portion on the first substrate side. The front surface of the concave portion on the first substrate side is formed planarized. When a load is applied to the first substrate and the second substrate, the second columnar structure comes into abutment against (into full contact with) the planarized front surface of the concave portion on the upper substrate, which restricts a cell gap between the first substrate and the second substrate.

SUMMARY

In the liquid crystal display device described in Japanese Patent Laid-open No. 2003-121857, when an excessive load is applied to the transparent substrate and the opposite substrate, the first columnar spacer previously disposed in abutment against the front surface of the opposite substrate is such that its abutment surface is hard to be broken. This is because the excessive load applied to the transparent substrate and the opposite substrate is distributed. On the other hand, when coming into abutment against (into full contact with) the planarized front surface of the opposite substrate, the second columnar spacer provided to be spaced apart from the front surface of the opposite substrate is such that its abutment surface is likely to undergo a large load. This poses a problem in that the second columnar spacer may be broken in some cases.

In the liquid crystal display device described in Japanese Patent Laid-open No. 2007-171715, when an excessive load is applied to the upper substrate and the lower substrate, the first spacer previously disposed in abutment against the front surface of the lower substrate is such that its abutment surface is hard to be broken. This is because the excessive load applied to the upper substrate and the lower substrate is distributed. On the other hand, when coming into abutment against (into full contact with) the planarized front surface of the concave portion, the second spacer provided to be spaced apart from the front surface of the lower substrate is such that its abutment surface is likely to undergo a large load. This poses a problem in that the second spacer may be broken in some cases.

In the liquid crystal display device described in Japanese Patent Laid-open No. 2008-242035, when a load is applied to the first substrate and the second substrate, the first columnar structure previously disposed in abutment against the front surface of the second substrate is such that its abutment surface is hard to be broken. This is because the excessive load applied to the first substrate and the second substrate is distributed. On the other hand, when coming into abutment against (into full contact with) the planarized front surface of the concave portion, the second columnar structure provided to be spaced apart from the front surface of the second substrate is such that its abutment surface is likely to undergo a large load. This poses a problem in that the second columnar structure may be broken in some cases.

In the liquid crystal display device described in each of Japanese Patent Laid-open No. 2003-121857, 2007-171715 and 2008-242035, the second spacer is formed to be spaced apart at a given clearance from the second substrate. In this case, if the clearance between the second spacer and the second substrate is too large, the first spacer is excessively deformed, so that it is probable that the first spacer may be broken before the second spacer and the second substrate come into contact with each other. On the other hand, the clearance between the second spacer and the second substrate may be too narrow. In such a case, the second spacer and the second substrate come into contact with each other in an early stage when the liquid crystal layer in the liquid crystal display device shrinks at low temperatures. The abutment area between the spacer and the substrate is suddenly increased so that the spacer cannot follow the shrinkage of the liquid crystal layer and in turn bubbles may probably occur. Thus, there is a problem in that it is very difficult to optimally adjust the clearance between the second spacer and the second substrate.

Thus, it may be desirable to provide a liquid crystal display device, a liquid crystal display device manufacturing method and an electronic device that can prevent a second spacer from being broken when an excessive load is applied to a first substrate and the second substrate and that can make it easy to adjust a clearance between the second spacer and the second substrate.

According to a mode, there is provided a liquid crystal display device including: first and second substrates disposed oppositely to each other; a first spacer formed on a side of the first substrate so as to be directly or indirectly abutted against a side of the second substrate; and a second spacer formed on the first substrate side so as to be spaced apart from the second substrate side; wherein a concavo-convex portion is formed in an area, of the second substrate, corresponding to the second spacer on the first substrate side.

In the liquid crystal display device according to the first mode, a liquid crystal layer in the liquid crystal display device may shrink at low temperatures. In such a case, since the second spacer and the second substrate are formed to be spaced apart from each other, i.e., the area where the spacers are in contact with the substrate is small, also the substrate clearance can sufficiently follow the shrinkage of the liquid crystal layer. Thus, the occurrence of babbles can be prevented. As described above, the concavo-convex portion is formed in the area, of the second substrate, corresponding to the second spacer on the first substrate side. Therefore, when an excessive load is applied to the first and second substrates, the front surface of the second spacer on the second substrate side first comes into contact with the top of the convex portion of the concavo-convex portion, unlike in the case where the front surface of the second spacer on the second substrate side comes into abutment against (into full contact with) the planar front surface of the concave portion formed on the second substrate side. Then, the convex portion of the concavo-convex portion is elastically deformed so as to be crushed. At this time, also the front surface of the second spacer on the second substrate side is elastically deformed from the flat surface shape to a shape reflecting the front surface shape of the concavo-convex portion. In addition, the front surface of the second spacer on the second substrate side is elastically deformed until it comes into abutment against the front surface of the concave portion of the concavo-convex portion. In this way, the front surface of the second spacer on the second substrate side comes into abutment against the top of the convex portion of the concavo-convex portion and then against the front surface of the concave portion of the concavo-convex portion. In accordance with this, it is possible to alleviate the concentration, of the excessive load applied to the first and second substrates, on the abutment portion of the second spacer. Thus, it is possible to prevent the second spacer from being broken when the excessive load is applied to the first and second substrates. Since the concavity and convexity on the second substrate side are used, the abutment area between the second spacer and the second substrate can moderately be varied. Therefore, it is possible to suppress rapid changes in the abutment area between the substrate and the spacers. Thus, even if the clearance between the second spacer and the second substrate is narrowed in some degree, the substrate clearance can sufficiently follow the shrinkage of the liquid crystal layer. Consequently, the clearance adjustment between the second spacer and the second substrate can be performed more easily than ever before.

Preferably, the liquid crystal display device according to the first mode described above includes a planarizing film made of a photosensitive resin formed on the first substrate side of the second substrate and the concavo-convex portion is formed in an area, of polarizing film, corresponding to the second spacer. With this configuration, if the planarizing film made of a photosensitive resin is used, the concavo-convex portion can easily be formed on the planarizing film by a photolithographic technique.

In this case, preferably, the concavo-convex portion includes a dent portion formed integrally with the planarizing film, the first and second spacers are formed to have generally the same height in a direction perpendicular to a front surface of the first substrate, and a top of a convex portion of the dent portion is formed lower than an upper surface, of the planarizing film, in an area other than the dent portion. With this configuration, it is easy to provide the clearance between the front surface of the second spacer on the second substrate side and the top of the convex portion of the dent portion.

Preferably, in the liquid crystal display device provided with the planarizing film, the concavo-convex portion is formed on a front surface of the planarizing film independently of the planarizing film, the second spacer is formed to have a height lower than that of the first spacer in a direction perpendicular to a front surface of the first substrate, and a top of a convex portion of the concavo-convex portion is formed higher than an upper surface of the planarizing film. With this configuration, for example, the concavo-convex portion having a height smaller than a clearance between the second spacer and the second substrate is formed between the second spacer and the second substrate. Thus, the clearance can easily be provided between the front surface of the second spacer on the second substrate side and the top of the convex portion of the dent portion.

In the liquid crystal display device according to the first mode described above, preferably, the first and second substrates include a plurality of sub-pixels, each of the sub-pixels includes a transparent area adapted to transmit light and a reflective area adapted to reflect light, the first and second spacers are formed in the reflective area of the sub-pixel as viewed from above, and the concavo-convex portion is formed in an area, corresponding to the second spacer, in the planarizing film formed in the reflective area. With this configuration, it is possible to suppress lowering of the light transmittance of the transparent area compared with the case where the concavo-convex portion is formed in the transparent area.

Preferably, the liquid crystal display device according to the first mode further includes a thin film transistor formed on the front surface of the second substrate and the concavo-convex portion is formed above the thin film transistor. With this configuration, the concavo-convex portion and the second spacer are disposed in an area corresponding to a thin film transistor forming area which is an area where light is shielded by a light-shielding film. Therefore, it is not necessary to provide a light-shielding film used to perform light-shielding on the second spacer in addition to the thin film transistor. In this way, since an increase in light-shielding area can be suppressed, it is possible to suppress lowering in light transmittance.

According to a second mode, there is provided a method of manufacturing a liquid crystal display device including first and second substrates disposed oppositely to each other, a first spacer formed on a side of the first substrate so as to be directly or indirectly abutted against a side of the second substrate, and a second spacer formed on the first substrate side so as to be spaced apart from the second substrate side, the method including: a step of forming an insulating film made of a photosensitive material on the second substrate side; and an exposure step of forming a concavo-convex portion on the insulating film so as to correspond to the second spacer, by exposing an area corresponding to the second spacer by use of a mask formed with a pattern for concavo-convex portion formation.

In the method of manufacturing a liquid crystal display device according to the second mode, preferably, the pattern for concavo-convex portion formation is formed of an opening portion having a width smaller than exposure limit resolution.

An electronic device according to a third mode includes the liquid crystal display device having any one of the configurations described above. With this configuration, an electronic device can be provided that is provided with the liquid crystal display device that can prevent the breakage of the second spacer even if an excessive load is applied to the first and second substrates.

Additional features and advantages are described herein, and will be apparent from the following Detailed Description and the figures.

DETAILED DESCRIPTION

The present application is described below in detail with reference to the drawings according to an embodiment. The detailed description is provided as follows:

First Embodiment

A configuration of a liquid crystal display device 100 according to a first embodiment is described with reference to FIGS. 1 and 2. Incidentally, the first embodiment describes the liquid crystal display device 100 with a longitudinal electric field mode embodying the present application.

Figure 1:
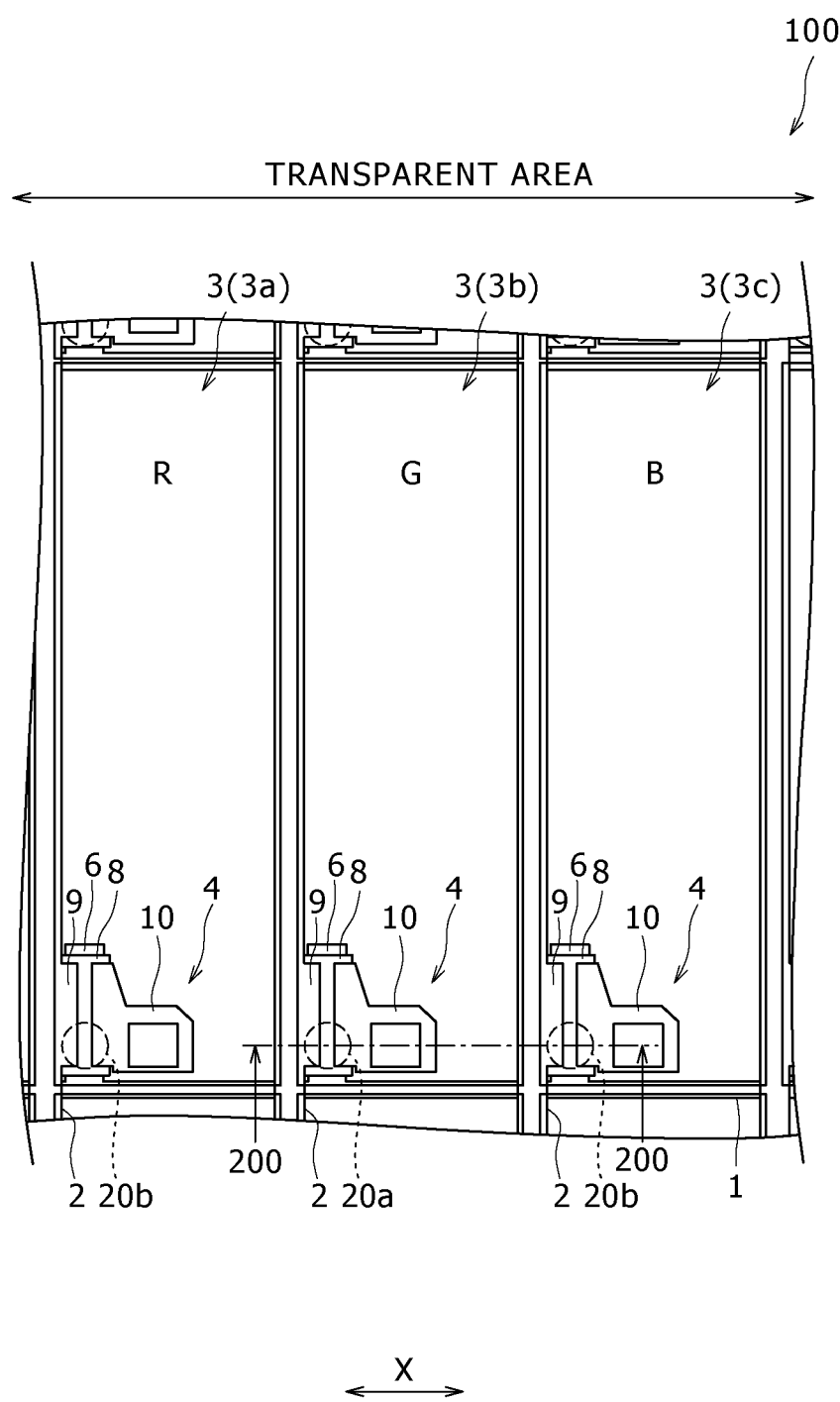
FIG. 1 is a plan view of a liquid crystal display device according to a first embodiment.

Referring to FIG. 1, the liquid crystal display device 100 of the first embodiment includes scanning lines 1 and signal lines 2 disposed to intersect with the scanning lines 1. A plurality of sub-pixels 3 (sub-pixels 3a, 3b, 3c) are provided to correspond to respective positions where the scanning lines 1 and the signal lines 2 intersect with each other. The plurality of sub-pixels 3 (the sub-pixels 3a, 3b and 3c) are each provided with a bottom gate-type thin film transistor (TFT) 4.

Figure 2:
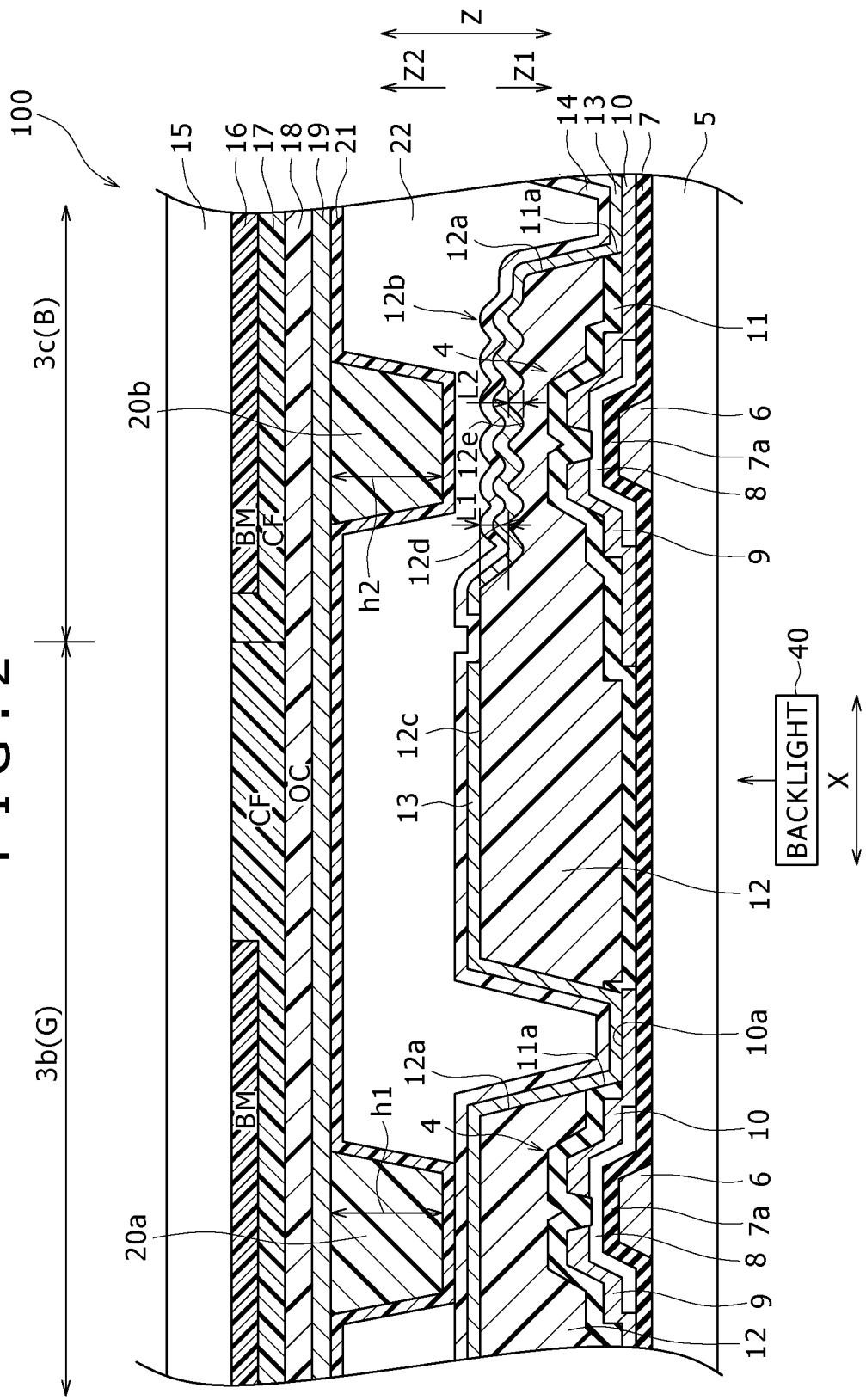
FIG. 2 is a cross-sectional view taken along line 200-200 of FIG. 1.

Referring to FIG. 2, in a sectional structure of the sub-pixels 3 (the sub-pixel 3a to 3c), gate electrodes 6 are formed on the front surface of a TFT substrate 5. Incidentally, the TFT substrate 5 is an example of "a second substrate" of the embodiments. An insulating film 7 including a gate insulator film 7a made of SiN is formed on the front surface of the gate electrode 6 and of the TFT substrate 5. A semiconductor layer 8 is formed to face the gate electrode 6 via the insulating film 7. Incidentally, the semiconductor layer 8 is made of a-Si and n+Si. A source electrode 9 and a drain electrode 10 are formed on the semiconductor layer 8. The gate electrode 6, the insulating film 7, the semiconductor layer 8, the source electrode 9 and the drain electrode 10 constitute the thin film transistor 4.

A passivation layer 11 made of SiN is formed to cover the source electrode 9 and the drain electrode 10. A planarizing film 12 made of an elastically deformable photosensitive acryl resin is formed on the front surface of the passivation layer 11. The planarizing film 12 is formed with a contact hole 12a. In the first embodiment, the planarizing film 12 is formed with a dent portion 12b in an area corresponding to the sub-pixel 3c. The dent portion 12b is formed integrally with the planarizing film 12. Incidentally, the dent portion 12b is one example of "a concavo-convex portion" of the embodiments. This dent portion 12b is formed above (a direction of arrow Z2) the thin film transistor 4. The surface of the dent portion 12b has a concavo-convex shape (wavelike shape). A distance L1 between the flat surface (upper surface) 12c of the planarizing film 12 and tops 12d of convex portions on the front surface of the dent portion 12b is approximately 0.5 μm. In the first embodiment, the tops 12d of the convex portions of the dent portion 12b is formed lower than the upper surface 12c of an area, other than the dent portion 12b, of the planarizing film 12. A distance L2 between the tops 12d of the convex portions of the front surface of the dent portion 12b and bottoms 12e of the concave portions of the dent portion 12b is approximately 0.4 μm.

A description is next given of a method of forming the dent portion (the concavo-convex portion) 12b. In a planarizing film forming step, first, the planarizing film 12 made of an acrylic photosensitive material is formed on the front surface of the passivation layer 11 by a coating method. Incidentally, the planarizing film 12 is an example of "an insulating film" of the embodiments. In a dent portion (concavo-convex portion) forming step (exposure step), a mask (not illustrated) is disposed to face the planarizing film 12. This mask is such that a light-shielding film made of metal such as chrome or the like is formed on the front surface of a glass substrate. The light-shielding film of the mask is formed with a plurality of opening portions (a pattern for forming the dent portion (the concavo-convex portion)) used to form the dent portion (the concavo-convex portion) 12b and having a width smaller than exposure limit resolution. In the first embodiment, the dent portion (the concavo-convex portion) 12b is formed in an area of the planarizing film 12 corresponding to a sub-columnar spacer 20b described later by performing the exposure step using the mask. In this way, the dent portion (the concavo-convex portion) 12b having a plurality of convexities and concavities is formed on the front surface of the planarizing film 12. Incidentally, it may be conceivable to use a half tone mask as a mask used to form the dent portion in the exposure step. This half tone mask includes a transmissive portion generally fully transmitting emitted light; a semi-transmissive portion formed of a film having such a transmissivity as to transmit a portion of emitted light; and a light-shielding portion not transmitting emitted light. The semi-transmissive portion of the half tone mask is formed with the film having a low transmissivity; therefore, the structure of the half tone mask is complicated accordingly and it is very difficult to adjust the semi-transmissive portion to desired exposure intensity. On the other hand, the use of the mask formed with the plurality of opening portions having a width smaller than exposure limit resolution as described above is generally free from such a problem with the half tone mask. Thus, the dent portion can very simply be formed.

A pixel electrode 13 composed of a transparent electrode such as ITO (Indium Tin Oxide), IZO (Indium Zinc Oxide) or the like is formed to cover the planarizing film 12. The front surface of the pixel electrode 13 is formed to have a shape reflecting the concavo-convex shape of the front surface of the dent portion 12b of the planarizing film 12. The pixel electrode 13 is connected to the drain electrode 10 via a contact hole 11a of the passivation layer 11 and a contact hole 12a of the planarizing film 12. An alignment film 14 made of an organic film such as polyimide or the like is formed on the front surface of the pixel electrode 13. The front surface of the alignment film 14 is formed in a shape reflecting the concavo-convex shape of the front surface of the dent portion 12b of the planarizing film 12 and of the pixel electrode 13.

An opposite substrate 15 is provided to face the TFT substrate 5. Incidentally, the opposite substrate 15 is an example of "a first substrate" of the embodiments. A black matrix 16 made of resin or the like is formed on the front surface of the opposite substrate 15.

A color filter (CF) 17 is formed on the front surface of the black matrix 16. Incidentally, as illustrated in FIG. 1, the color filter 17 includes three color filters 17 of red (R), green (G) and blue (B), which are provided on the sub-pixels 3a, 3b and 3c, respectively. As illustrated in FIG. 2, an over coat layer (OC) 18 serving as a protecting layer is formed on the front surface of the color filter 17. An opposite electrode 19 composed of a transparent electrode such as ITO, IZO or the like is formed on the front surface of the over coat layer 18.

In the first embodiment, a main columnar spacer (PS) 20a made of an elastically deformable photosensitive resin such as a photosensitive acrylic resin is provided on the front surface of the opposite electrode 19 corresponding to the sub-pixel 3b. Incidentally, the main columnar spacer 20a is an example of "a first spacer" in the embodiments. The main columnar spacer 20a has a function of adjusting a cell gap (a distance between the TFT substrate 5 and the opposite substrate 15).

In the first embodiment, a sub-columnar spacer 20b made of the same elastically deformable photosensitive resin such as a photosensitive acrylic resin as the main columnar spacer 20a is provided on the front surface of the opposite electrode 19 corresponding to the sub-pixel 3c. Incidentally, the sub-columnar spacer 20b is an example of "a second spacer" in the embodiments. The sub-columnar spacer 20b is disposed in an area facing the dent portion 12b as viewed from above. An arrow Z1-directional front surface of the sub-columnar spacer 20b formed in the sub-pixel 3c is spaced from at a predetermined clearance from an arrow Z2-directional front surface of the dent portion 12b.

In the first embodiment, as illustrated in FIG. 1, the main columnar spacer 20a and the sub-columnar spacer 20b are provided to overlap the corresponding thin film transistors 4 and each formed in a generally circular shape as viewed from above. As illustrated in FIG. 2, a Z-directional height h1 of the main columnar spacer 20a is approximately equal to a Z-directional height h2 of the sub-columnar spacer 20b. An alignment film 21 made of an organic film such as polyimide is formed on the front surface of the main columnar spacer 20a and of the sub-columnar spacer 20b. The alignment film 21 formed on the front surface of the main columnar spacer 20a is disposed in abutment against the alignment film 14 on the TFT substrate 5 side. In this way, in the first embodiment, the main columnar spacer 20a is in indirect abutment against the alignment film 14 formed on the TFT substrate 5 side.

A crystal layer 22 is provided between the alignment film 14 and the alignment film 21. A backlight 40 is provided on the arrow Z1-directional side of the TFT substrate 5. The backlight 40 is configured to emit light from the TFT substrate 5 side toward the opposite substrate 15 side (on the arrow Z2-directional side).

Figure 3:
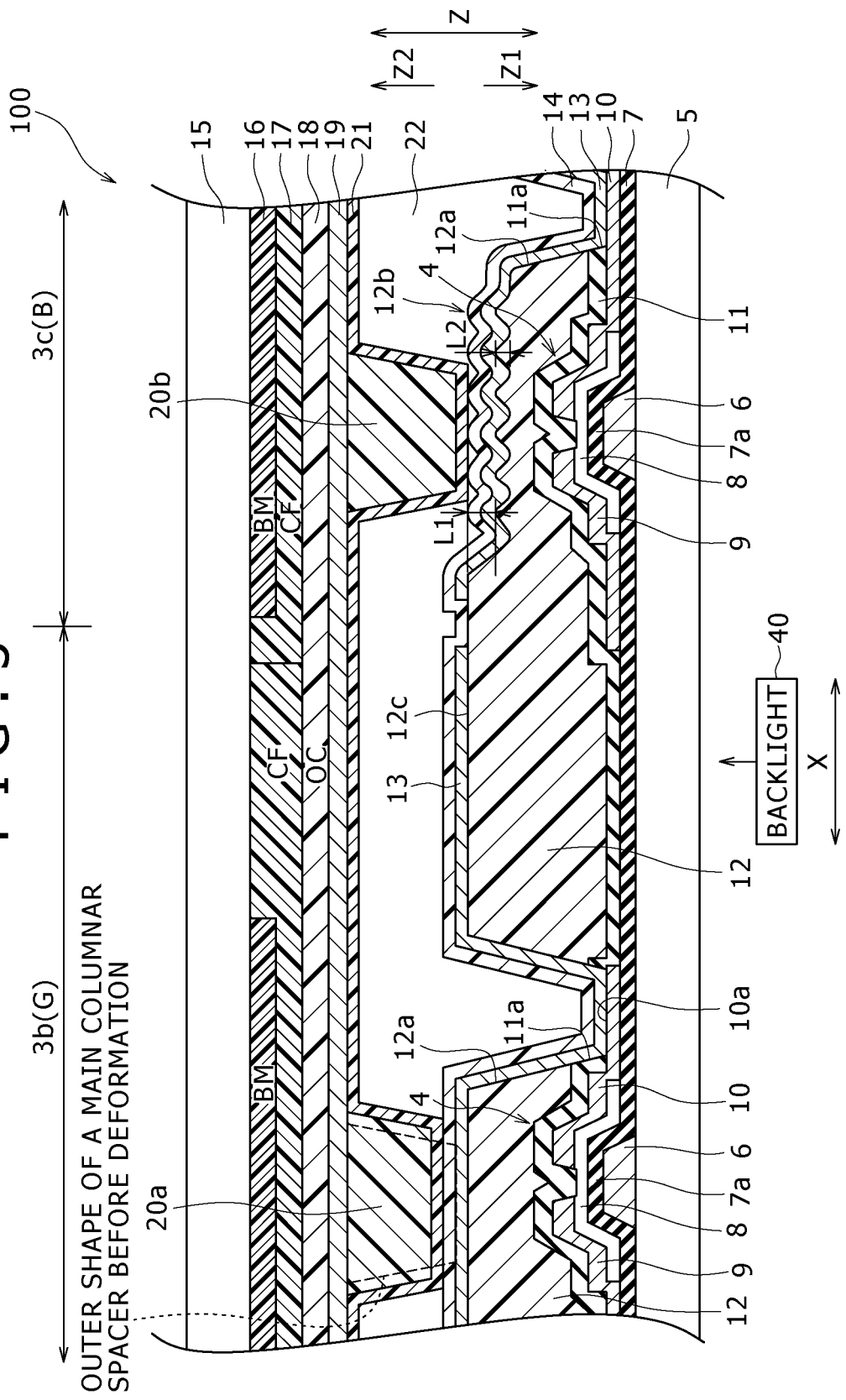
FIG. 3 is a view for assistance in explaining behavior encountered when an excessive load is applied to the liquid crystal display device according to the first embodiment.
Figure 4:
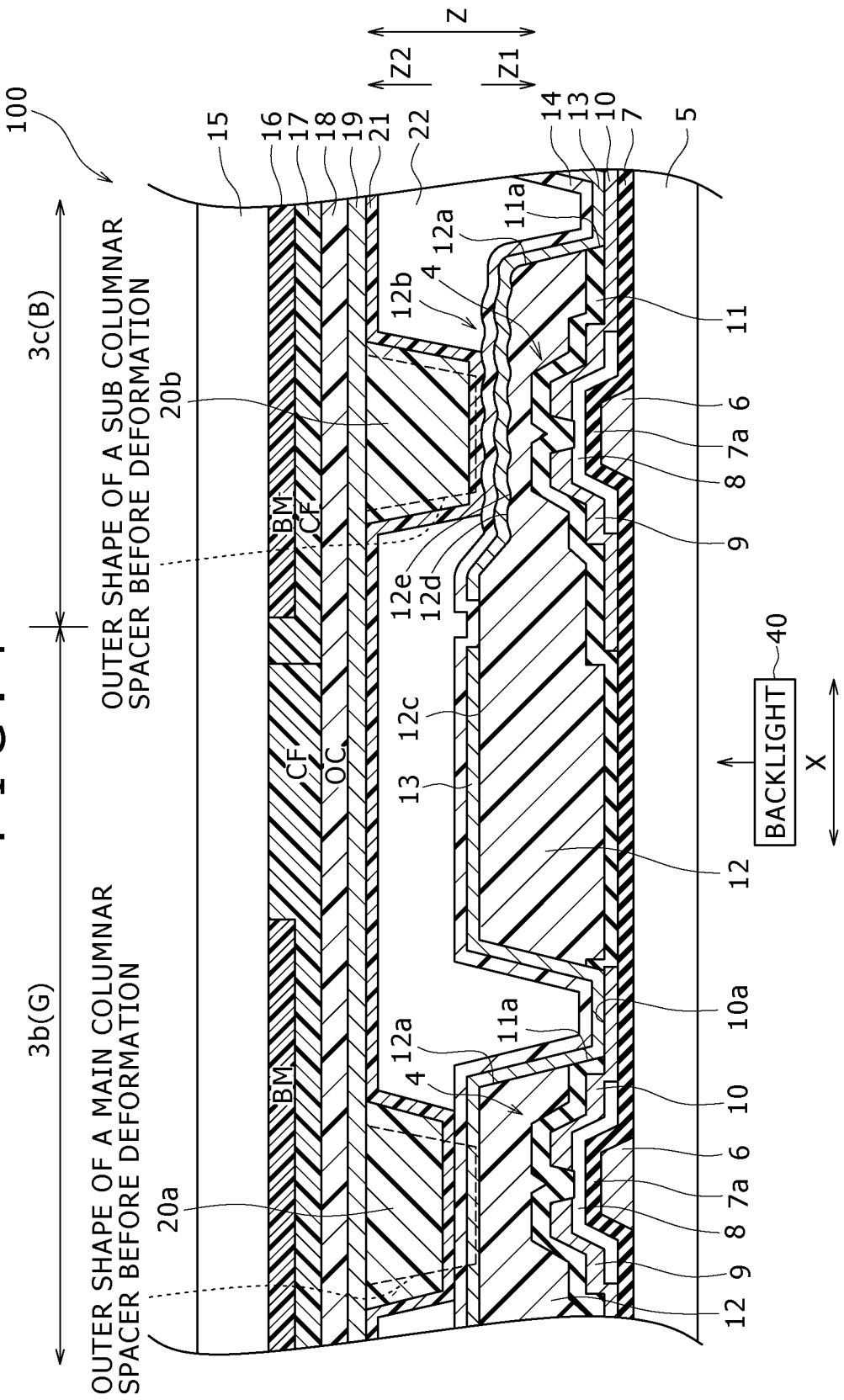
FIG. 4 is a view for assistance in explaining the behavior encountered when an excessive load is applied to the liquid crystal display device according to the first embodiment.

With reference to FIGS. 2 to 4, a description is next given of elastically deforming behavior of the main columnar spacer 20a, the sub-columnar spacer 20b and the dent portion 12b encountered when an excessive load is applied to the liquid crystal device 100.

If no load is applied to the liquid crystal display device 100 in the Z-direction, the main columnar spacer 20a formed in the sub-pixel 3b is not elastically deformed. The front surface of the alignment film 21 formed on the front surface of the main columnar spacer 20a is in abutment against (in full contact with) the front surface of the alignment film 14 formed on the TFT substrate 5 side. The sub-columnar spacer 20b formed on the sub-pixel 3c is disposed to be spaced apart from the TFT substrate 5 side.

A load may be applied to the liquid crystal display device 100 in the Z-direction or the liquid crystal layer 22 in the liquid crystal display device 100 may shrink at low temperatures. In such a case, the opposite substrate 15 bends in the arrow Z1-direction and the TFT substrate 5 bends in the arrow Z2-direction. As illustrated in FIG. 3, from the state where the alignment film 21 on the front surface of the main columnar spacer 20a is in abutment against (in full contact with) the alignment film 14 on the TFT substrate 5 side, the main columnar spacer 20a formed in the sub-pixel 3b is crushed and elastically deformed in the Z-direction by the opposite substrate 15 and the TFT substrate 5 as illustrate in FIG. 3. Specifically, the main columnar spacer 20a is elastically deformed so as to be compressed in the Z-direction and expanded in the X-direction. The front surface of the alignment film 21 formed on the front surface of the sub-columnar spacer 20b formed on the sub-pixel 3c first comes into partial contact with the front surface of the alignment film 14 corresponding to the tops 12d of the convex portions of the dent portion 12b, as a first stage.

If a Z-directional load is further applied to the liquid crystal display device 100, the opposite substrate 15 and the TFT substrate 5 is further bent in the Z-direction as illustrated in FIG. 4. In the state where the alignment film 21 on the front surface of the main columnar spacer 20a is in abutment against (in full contact with) the alignment film 14 on the TFT substrate 5 side, the main columnar spacer 20a formed in the sub-pixel 3b is crushed and further elastically deformed in the Z-direction by the opposite substrate 15 and the TFT substrate 5. In this case, the alignment film 21 formed on the front surface of the main columnar spacer 20a is disposed in previous abutment against the alignment film 14 formed on the TFT substrate 5 side. Therefore, the load applied to the liquid crystal device 100 is distributed without concentration on the abutment surface. Thus, it is possible to prevent the breakage of the main columnar spacer 20a.

The front surface of the alignment film 21 formed on the front surface of the sub-columnar spacer 20b formed in the sub-pixel 3c is crushed and elastically deformed in the Z-direction by the opposite substrate 15 and the TFT substrate 5, as a second stage, from the state of being abutted against the front surface of the alignment film 14 corresponding to the tops 12d of the convex portions of the dent portion 12b. The sub-columnar spacer 20b is elastically deformed so as to be compressed in the Z-direction and expanded in the X-direction. In this case, the front surface of the sub-columnar spacer 20b on the TFT substrate 5 side and a portion of the alignment film 21 corresponding to the front surface of the sub-columnar spacer 20b on the TFT substrate 5 side are elastically deformed in a concavo-convex shape reflecting the concavo-convex shape of the front surface of the dent portion 12b. Also the convex portion of the dent portion 12b is crushed and elastically deformed in the Z-direction.

Finally, a portion of the alignment film 21 corresponding to the front surface of the sub-columnar spacer 20b on the TFT substrate 5 side is elastically deformed until it comes into abutment against a portion of the alignment film 14 corresponding to the front surface of bottoms 12e of the convex portions of the dent portion 12b. At this time, such a portion does not become elastically deformed any more. In this way, the sub-columnar spacer 20b and the dent portion 12b are elastically deformed in the two stages of the first and second stages. Therefore, it is possible to alleviate the sudden application, of the excessive load applied to the liquid crystal display device 100, to the sub-columnar spacer 20b. In addition, it is possible to gradually increase an area where the spacer comes into contact with the substrate, between the first stage and the second stage. Thereafter, when no load is applied to the liquid crystal display device 100, the opposite substrate 15 returns to the arrow Z2-directional side and also the TFT substrate 5 returns to the arrow Z1-directional side. In this way, the shape of the main columnar spacer 20a and of the sub-columnar spacer 20b returns to the state illustrated in FIG. 2.

In the first embodiment described above, the area of the TFT substrate 5 corresponding to the sub-columnar spacer 20b on the opposite substrate 15 side is formed with the dent portion 12b. For example, when an excessive load is applied to the opposite substrate 15 and the TFT substrate 5, the front surface of the sub-columnar spacer 20b on the TFT substrate 5 side may come into abutment against (into full contact with) the planarized front surface of the concave portion formed on the TFT substrate 5 side. However, unlike such a case, the front surface of the sub-columnar spacer 20b on the TFT substrate 5 side first comes into contact with the alignment film 14 corresponding to the tops 12d of the convex portions of the dent portion 12b. The convex portions of the dent portion 12b are elastically deformed so as to be crushed. In this case, the front surface of the sub-columnar spacer 20b on the TFT substrate 5 side and also the front surface of the alignment film 21 on the TFT substrate 5 side of the sub-columnar spacer 20b are elastically deformed from the planarized shape to the shape reflecting the surface shape of the dent portion 12b. In addition, the portion of the alignment film 21 corresponding to the front surface of the sub-columnar spacer 20b on the TFT substrate 5 side is elastically deformed until it comes into abutment against the portion of the alignment film 14 corresponding to the front surface of the bottoms 12e of the concave portions of the dent portion 12b. In this way, the portion of the alignment film 21 corresponding to the front surface of the sub-columnar spacer 20b on the TFT substrate 5 side comes into abutment against the portion of the alignment film 14 corresponding to the tops 12d of the convex portions of the dent portion 12b and then against the portion of the alignment film 14 corresponding to the bottoms 12e of the concave portions of the dent portion 12b. Accordingly, the concentration, of the excessive load applied to the opposite substrate 15 and the TFT substrate 5, on the sub-columnar spacer 20b can be alleviated. Therefore, the breakage of the sub-columnar spacer 20b can be prevented when an excessive load is applied to the opposite substrate 15 and the TFT substrate 5. In addition, it is possible to gradually increase the area where the spacer and the substrate come into contact with each other. Therefore, although the distance between the sub-columnar spacer 20b and the front surface on the TFT substrate 5 side is short to a certain degree, the spacer can be allowed to follow the shrinkage of the liquid crystal layer 22 occurring at low temperatures.

In the first embodiment as described above, the dent portion 12b is formed in the area of the planarizing film 12 corresponding to the sub-columnar spacer 20b. Therefore, if the planarizing film 12 made of a photosensitive resin film is used, the dent portion 12b can easily be formed in the planarizing film 12 by photolithographic technique.

In the first embodiment as described above, the tops 12d of the convex portions of the dent portion 12b are formed lower than the upper surface 12c of the area, of the planarizing film 12, other than the dent portion 12b. Thus, a clearance can easily be provided between the portion of the alignment film 21 corresponding to the front surface of the sub-columnar spacer 20b on the TFT substrate 5 side and the portion of the alignment film 14 corresponding to the tops 12d of the convex portions of the dent portion 12b.

In the first embodiment as described above, by forming the dent portion 12b above the thin film transistor 4, the dent portion 12b and the sub-columnar spacer 20b are disposed in the area corresponding to the formation area of the thin film transistor 4 which is an area light-shielded by the black matrix 16. Therefore, it is not necessary to provide the black matrix 16 adapted to light-shield the sub-columnar spacer 20b in addition to the thin film transistor 4. This suppresses an increase in light-shielding area. Thus, it is possible to suppress the lowering of the light transmittance.

Second Embodiment

A second embodiment will next described with reference to FIG. 5. Unlike the first embodiment in which the dent portion 12b is formed integrally with the planarizing film 12, the second embodiment describes an example in which a concavo-convex portion 112 is provided on the front surface of a planarizing film 121 independently of the planarizing film 121.

Figure 5:
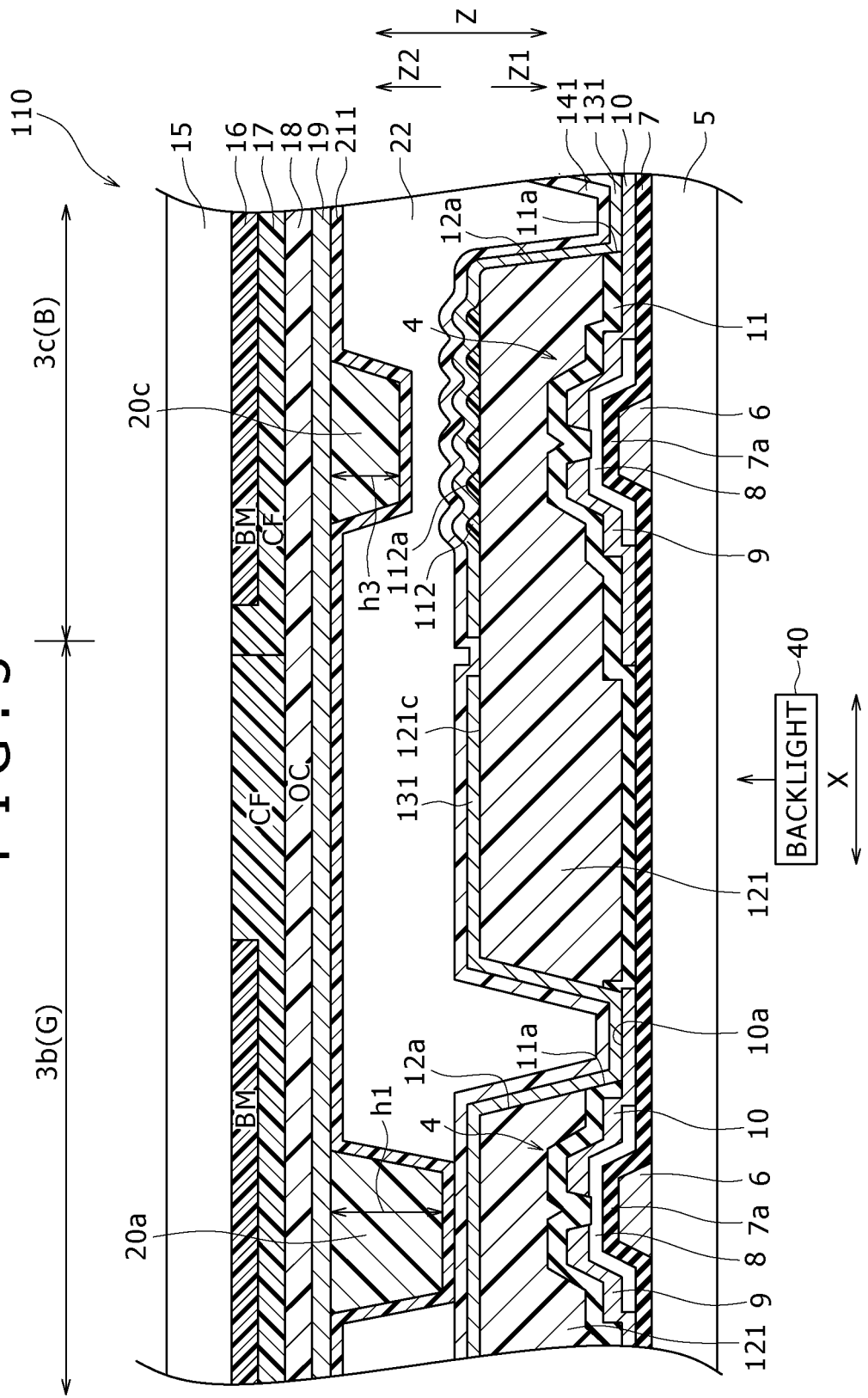
FIG. 5 is a cross-sectional view of a liquid crystal display device according to a second embodiment.

Referring to FIG. 5, in a liquid crystal display device 110 according to the second embodiment, the concavo-convex portion 112 is formed on the front surface of the planarizing film 121 in a sub-pixel 3c. In the second embodiment, the concavo-convex portion 112 is formed on the front surface of the planarizing film 121 independently of the planarizing film 121. The concavo-convex portion 112 is formed by applying an elastically deformable acrylic photosensitive resin film on the front surface of the planarizing film 121 and then performing photolithography (the exposure step) thereon. The front surface of the concavo-convex portion 112 is formed in a concavo-convex shape. In the second embodiment, tops 112a of convex portions of the concavo-convex portion 112 are formed higher than an upper surface 121c of the planarizing film 121.

A pixel electrode 131 composed of a transparent electrode such as ITO, IZO or the like is formed on the front surface of the concavo-convex portion 112. The pixel electrode 131 is formed in a shape reflecting the front surface shape (the concave-convex shape) of the concave-convex portion 112. An alignment film 141 made of an organic film such as polyimide or the like is formed on the front surface of the pixel electrode 131. The front surface of the alignment film 141 is formed in a shape reflecting a front surface shape (the concavo-convex shape) of the concavo-convex portion 112 and of the pixel electrode 13.

A sub-columnar spacer 20c made of a photosensitive resin film is formed in the sub-pixel 3c on the opposite substrate 15 side. Incidentally, the sub-columnar spacer 20c is one example of "a second spacer" of the embodiments. The sub-columnar spacer 20c is formed above the concavo-convex portion 112 (on an arrow Z2-directional side). In the second embodiment, a height h3 of the sub-columnar spacer 20c formed above the concavo-convex portion 112 (on the arrow Z2-directional side) is lower than a height h1 of the main columnar spacer 20a formed in the sub-pixel 3b.

An alignment film 211 made of an organic film such as polyimide or the like is formed on the front surface of the main columnar spacer 20a and of the sub-columnar spacer 20c. The front surface of the alignment film 211 formed on the arrow Z1-directional side front surface of the sub-columnar spacer 20c is spaced apart from the front surface of the alignment film 141 formed on the arrow Z2-directional side of the concavo-convex portion 112.

Incidentally, the other configurations of the second embodiment are the same as those of the first embodiment. The elastically deforming behavior of the main columnar spacer 20a, the sub-columnar spacer 20c and the concavo-convex portion 112 encountered when an excessive load is applied to the liquid crystal device 110 is the same as that of the first embodiment described above.

In the second embodiment as described above, the tops 112a of the convex portions of the concavo-convex portion 112 are formed higher than the upper surface 121c of the planarizing film 121. Thus, a clearance can easily be defined between a portion of the alignment film 211 corresponding to the front surface of the sub-columnar spacer 20c on the TFT substrate 5 side and a portion of the alignment film 141 corresponding to the tops 112a of the convex portions of the concavo-convex portion 112.

Incidentally, the other effects of the second embodiment are the same as those of the first embodiment described above.

Third Embodiment

Figure 6:
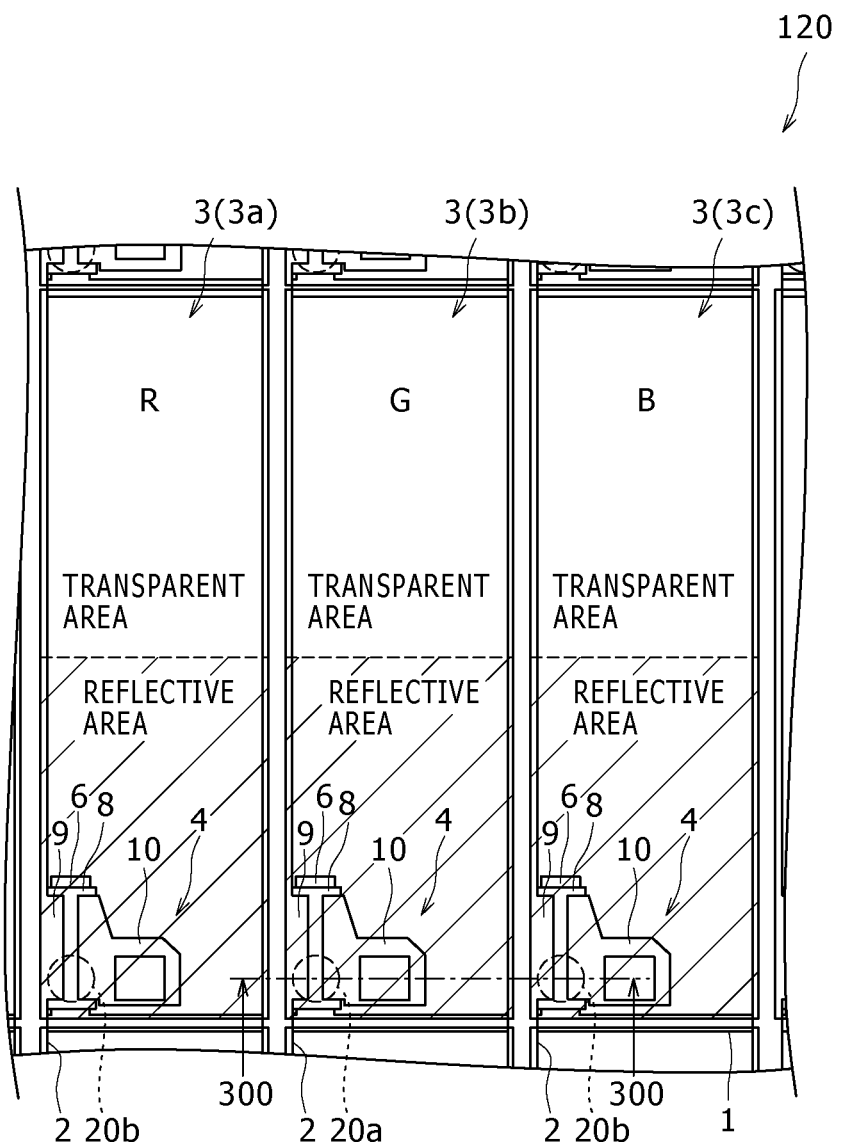
FIG. 6 is a plan view of a liquid crystal display device according to a third embodiment.

A third embodiment is next described with reference to FIGS. 6 and 7. The third embodiment describes an example in which any one of a main columnar spacer 20a and a sub-columnar spacer 20b is disposed in a reflective area of each of sub-pixels 3 (3a to 3c). This example is different from the first embodiment in which any one of the main columnar spacer 20a and the sub-columnar spacer 20b is disposed in the transparent area of each of the sub-pixels 3 (3a to 3c).

In a liquid crystal display device 120 according to the third embodiment, the sub-pixels 3 (3a to 3c) are each provided with a transparent area adapted to transmit light in an arrow Y1-direction of the sub-pixel 3 and a reflective area adapted to reflect light in an arrow Y2-direction of the sub-pixel 3. Thus, a semi-transmissive liquid crystal display device 120 is configured.

Figure 7:
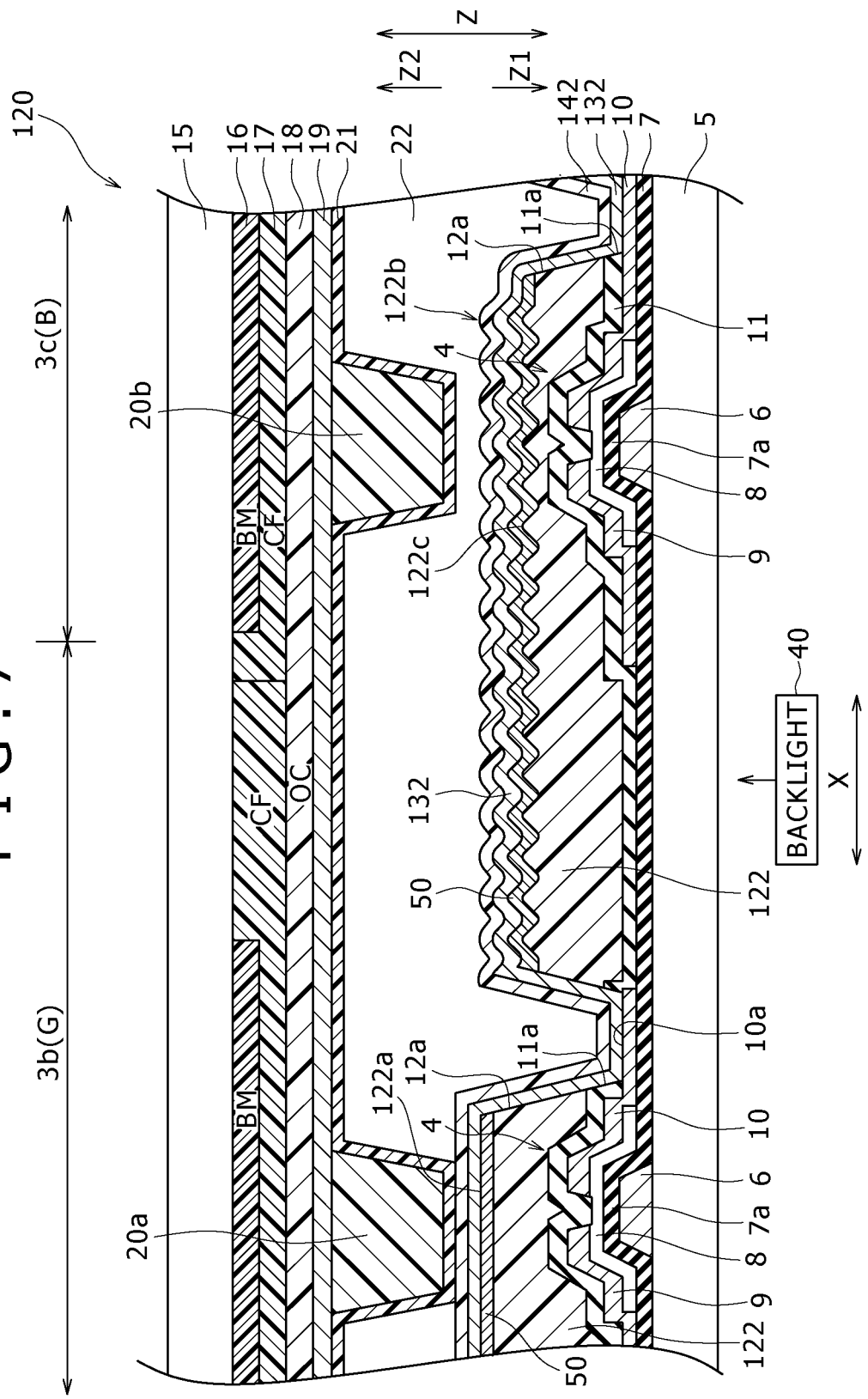
FIG. 7 is a cross-sectional view taken along line 300-300 of FIG. 6.

Referring to FIG. 7, in the reflective area, a planarizing film 122 made of an elastically deformable photosensitive acrylic resin is formed on a TFT substrate 5 side. In the sub-pixel 3b, an upper surface 122a of the planarizing film 122 in abutment against an arrow Z1-directional side of the elastically deformable main columnar spacer 20a is formed in a planar shape. A concavo-convex portion 122b with a concavo-convex front surface is formed on the front surface of the planarizing film 122 in an area other than the area where the main columnar spacer 20a is disposed in the reflective area. Tops 122c of convex portions of the concavo-convex portion 122b is formed lower than the upper surface 122a of the planarizing film 122 in the area where the main columnar spacer 20a is formed.

A reflective film 50 made of an Al (aluminum) layer adapted to reflect light is formed on the front surface corresponding to the concavo-convex portion 122b of the planarizing film 122. The front surface of the reflective film 50 is formed in a shape reflecting the concavo-convex shape of the front surface of the concavo-convex portion 122b of the planarizing film 122.

A pixel electrode 132 is formed on the front surface of the reflective film 50. The front surface of the pixel electrode 132 formed in an area other than the area where the main columnar spacer 20a is disposed is formed in a shape reflecting the concavo-convex shape of the front surface of the concavo-convex portion 122b and of the reflective film 50.

An alignment film 142 is formed on the front surface of the pixel electrode 132. A front surface of the alignment film 142 formed in an area other than the area where the main columnar spacer 20a is formed in a shape reflecting the concavo-convex shape of the front surface of the reflective film 50 and of the pixel electrode 132.

Incidentally, the other configurations of the third embodiment are the same as those of the first embodiment described above. The elastically deforming behavior of the main columnar spacer 20a, the sub-columnar spacer 20b and the concavo-convex portion 122b encountered when an excessive load is applied to the liquid crystal device 120 is the same as that of the first embodiment described above.

In the third embodiment described above, the concavo-convex portion 122b is formed in the area, corresponding to the columnar spacer 20b, of the planarizing film 122 formed in the reflective area. Thus, it is possible to suppress the lowering of the light transmittance in the transparent area compared with the case where the concavo-convex portion 122b is formed in the transparent area.

Incidentally, the other effects of the third embodiment are the same as those of the first embodiment described above.

Fourth Embodiment

A fourth embodiment is described with reference to FIGS. 2 and 8. The fourth embodiment describes an example where both a main columnar spacer 20a and a sub-columnar spacer 20b are formed in each of sub-pixels 3 (3a to 3c). This example is different from the first embodiment in which any one of the main columnar spacer 20a and the sub-columnar spacer 20b is disposed in each of the sub-pixels 3 (3a to 3c).

Figure 8:
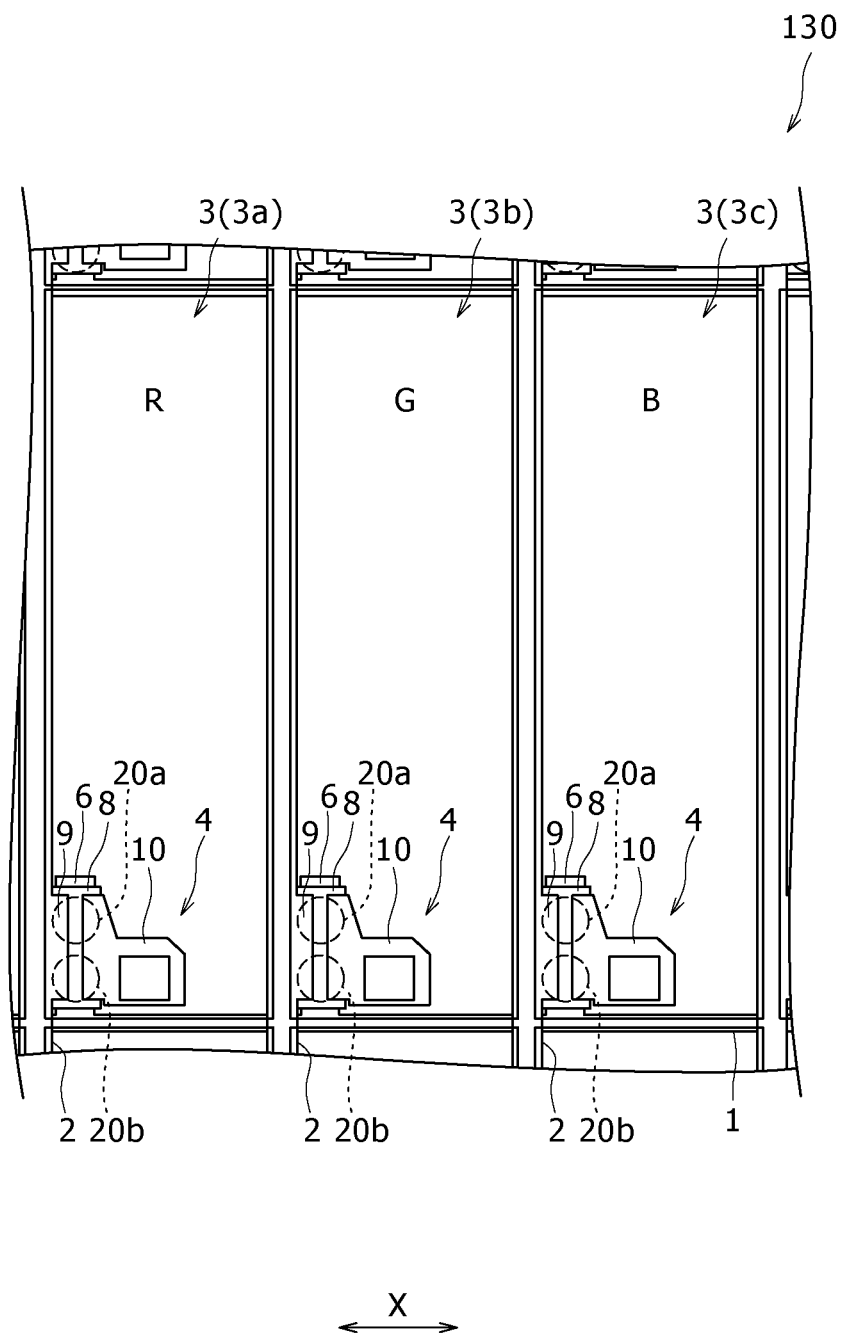
FIG. 8 is a plan view of a liquid crystal display device according to a fourth embodiment.

Referring to FIG. 8, in a liquid crystal display device 130 according to the fourth embodiment, both the main columnar spacer 20a and the sub-columnar spacer 20b are formed in each of the sub-pixels 3 (3a to 3c). A dent portion 12b (a concavo-convex portion) (see FIG. 2) is formed in an area, corresponding to the sub-columnar spacer 20b, of a planarizing film 12 on a TFT substrate 5 side. In other words, the dent portion 12b (the concavo-convex portion) is formed in each of the sub-pixels 3 (3a to 3c).

Incidentally, the other configurations of the fourth embodiment are the same as those of the first embodiment described above. The elastically deforming behavior of the main columnar spacer 20a, the sub-columnar spacer 20b and the dent portion 12b encountered when an excessive load is applied to the liquid crystal device 130 is the same as that of the first embodiment described above.

The effect of the fourth embodiment is the same as that of the first embodiment described above.

Figure 9:
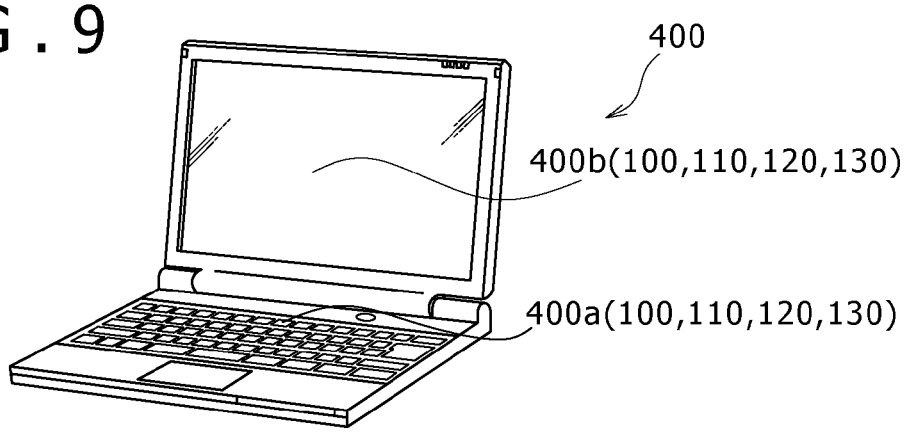
FIG. 9 is a view for assistance in explaining a first example of an electronic device using the liquid crystal display device according to each of the first through fourth embodiments.
Figure 10:
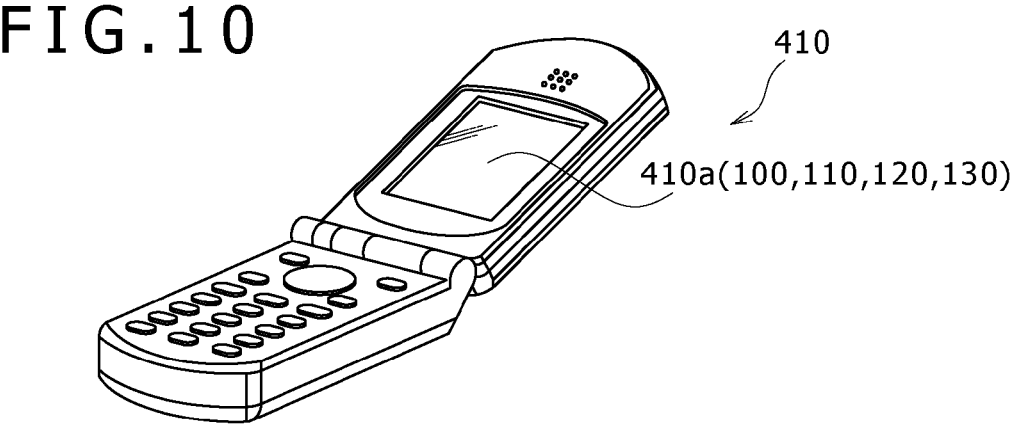
FIG. 10 is a view for assistance in explaining a second example of the electronic device using the liquid crystal display device according to each of the first through fourth embodiments.
Figure 11:
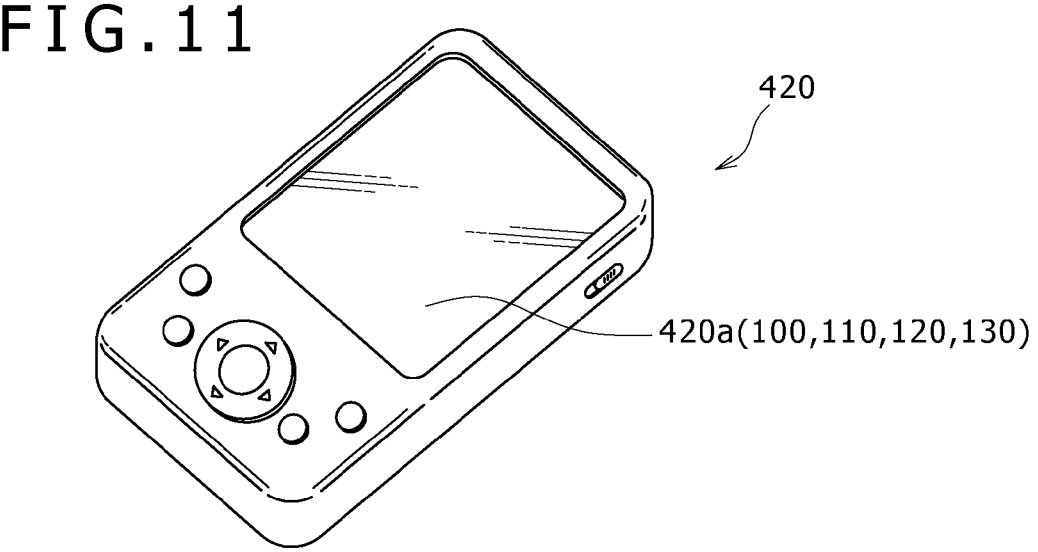
FIG. 11 is a view for assistance in explaining a third example of the electronic device using the liquid crystal display device according to each of the first through fourth embodiments.

FIGS. 9, 10 and 11 are views for assistance in explaining first, second and third examples, respectively, of electronic devices using each of the liquid crystal devices 100, 110, 120 and 130 according, respectively, to the first, second, third and fourth embodiments. The electronic devices using each of the liquid crystal display devices 100, 110, 120 and 130 according, respectively, to the first, second, third and fourth embodiments are described with reference to FIGS. 9, 10 and 11.

The liquid crystal display devices 100, 110, 120 and 130 according, respectively, to the first, second, third and fourth embodiments can each be used in a personal computer (PC) 400 as a first example, a mobile phone 410 as a second example and a personal digital assistant (PDA) 420 as a third example.

In the PC 400 of the first example in FIG. 9, the liquid crystal display devices 100, 110, 120 and 130 according, respectively, to the first, second, third and fourth embodiments can each be used in an input portion 400a such as a keyboard or the like and in a display screen 400b. In the mobile phone 410 of the second example in FIG. 10, the liquid crystal display devices 100, 110, 120 and 130 according, respectively, to the first, second, third and fourth embodiments can each be used in a display screen 410a. In the personal digital assistant 420 of the third example in FIG. 11, the liquid crystal display devices 100, 110, 120 and 130 according, respectively, to the first, second, third and fourth embodiments can each be used in a display screen 420a.

Incidentally, the embodiments disclosed here should be understood to be exemplary rather than restrictive in all respects. The scope is represented by not the descriptions of the embodiments but the following claims. Accordingly, any and all modifications, variations or equivalent arrangements which may occur to those skilled in the art should be considered to be within the scope of the application.

For example, the first through fourth embodiments represent the examples using the liquid crystal display device of a longitudinal electric field mode; however, the application is not limited to this. For example, liquid crystal display devices of types other than the longitudinal electric field mode may be used.

The first through fourth embodiments represent the example in which the dent portion (the concavo-convex portion) is formed in the area, in the planarizing film formed in the TFT substrate, corresponding to the sub-columnar spacer on the opposite substrate side. However, the application is not limited to this. For example, if the dent portion (the concavo-convex portion) can be formed in the area corresponding to the sub-columnar spacer, it may be formed in an area other than in the planarizing film.

The first through fourth embodiments represent the example in which the main columnar spacer is formed in indirect abutment against the TFT substrate side via the alignment film. However, the application is not limited to this. For example, it is acceptable that the front surface of the main columnar spacer and the TFT substrate side are in direct abutment against each other without formation of the alignment film on the front surface of the main columnar spacer.

The second embodiment describes the example in which the concavo-convex portion made of the same material as the planarizing film is formed on the front surface of the planarizing film. However, the application is not limited to this. For example, if the concavo-convex portion can be formed on the front surface of the planarizing film, the concavo-convex portion made of a material different from that of the planarizing film is formed on the planarizing film.

The first through third embodiments represent the example in which any one of the main columnar spacer and the sub-columnar spacer is formed in each of the sub-pixels. However, the present application is not limited to this. For example, any one of the main columnar spacer and the sub-columnar spacer may be formed on the two sub-pixels basis or on the three sub-pixels basis.

The first through fourth embodiments represent the example in which the sub-pixels of three colors, red, green and blue, constitute the pixel. However, the present application is not limited to this. For example, sub-pixels of two, four or more colors may constitute a pixel.

The first through fourth embodiments describe the example in which the front surface in the area, of the planar film on the TFT substrate side, corresponding to the main columnar spacer is formed planarized. However, the present application is not limited to this. For example, the front surface in the area, of the planar film on the TFT substrate side, corresponding to the main columnar spacer may be formed in a dent portion having a concavo-convex shape.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The invention claimed is:

1. A liquid crystal display device comprising:
   first and second substrates disposed oppositely to each other;
   a first spacer formed on a side of the first substrate so as to be directly or indirectly abutted against a side of the second substrate; and
   a second spacer formed on the first substrate side so as to be spaced apart from the second substrate side;

wherein a concavo-convex portion is formed in an area, of the second substrate, corresponding to the second spacer on the first substrate side; and a planarizing film made of a photosensitive resin formed on the first substrate side of the second substrate, wherein the concavo-convex portion is formed in an area, of the planarizing film, corresponding to the second spacer, and wherein the concavo-convex portion includes a dent portion formed integrally with the planarizing film;

the first and second spacers are formed to have generally the same height in a direction perpendicular to a front surface of the first substrate; and a top of a convex portion of the dent portion is formed lower than an upper surface, of the planarizing film, in an area other than the dent portion.

2. The liquid crystal display device according to claim 1, wherein the first and second substrates include a plurality of sub-pixels;

each of the sub-pixels includes a transparent area adapted to transmit light and a reflective area adapted to reflect light;

the first and second spacers are formed in the reflective area of the sub-pixel as viewed from above; and the concavo-convex portion is formed in an area, corresponding to the second spacer, in the planarizing film formed in the reflective area.

3. The liquid crystal display device according to claim 1, further comprising:

a thin film transistor formed in a front surface of the second substrate;

wherein the concavo-convex portion is formed above the thin film transistor.

4. The liquid crystal display device according to claim 1, further comprising an alignment film formed on at least one of the first and second substrates.

5. The liquid crystal display device according to claim 4, wherein the alignment film covers at least one of the first and second spacers.

6. An electronic device comprising a liquid crystal display device including:

first and second substrates disposed oppositely to each other;

a first spacer formed on a side of the first substrate so as to be directly or indirectly abutted against a side of the second substrate; and a second spacer formed on the first substrate side so as to be spaced apart from the second substrate side;

wherein a concavo-convex portion is formed in an area, of the second substrate, corresponding to the second spacer on the first substrate; and a planarizing film made of a photosensitive resin formed on the first substrate side of the second substrate, wherein the concavo-convex portion is formed in an area, of the planarizing film, corresponding to the second spacer, and wherein the concavo-convex portion includes a dent portion formed integrally with the planarizing film;

the first and second spacers are formed to have generally the same height in a direction perpendicular to a front surface of the first substrate; and a top of a convex portion of the dent portion is formed lower than an upper surface, of the planarizing film, in an area other than the dent portion.

7. The electronic device according to claim 6, further comprising an alignment film formed on at least one of the first and second substrates.

8. The liquid crystal display device according to claim 7, wherein the alignment film covers at least one of the first and second spacers.

* * * * *